United States Patent [19]

Suenaga et al.

[11] Patent Number: 5,712,003
[45] Date of Patent: Jan. 27, 1998

[54] BLOW-MOLDED ARTICLES FOR AUTOMOBILE EXTERIOR PARTS AND THE PROCESS THEREFOR

[75] Inventors: Kiyoshi Suenaga, Inazawa; Syojirou Miyamoto, Aichi-ken; Koichi Ogiso, Gifu, all of Japan

[73] Assignee: Toyoda Gosei Co., Ltd., Aichi, Japan

[21] Appl. No.: 545,931

[22] Filed: Oct. 20, 1995

[30] Foreign Application Priority Data

Oct. 24, 1994 [JP] Japan ................... 6-258204

[51] Int. Cl.⁶ ........................................ B32B 9/00
[52] U.S. Cl. ............... 428/31; 428/36.7; 428/36.9; 428/67; 428/192; 428/297; 428/323; 428/458; 428/462; 428/483; 428/910; 524/505; 524/507; 524/537; 293/120; 293/122; 293/136; 293/155; 264/506; 264/512; 264/515; 156/245; 156/287
[58] Field of Search ................... 428/192, 483, 428/458, 323, 36.9, 31, 462, 910, 36.7, 297, 67; 293/120, 122, 136, 155; 524/505, 507, 537; 264/279.1, 506, 512, 515, 516; 156/245, 287

[56] References Cited

U.S. PATENT DOCUMENTS

| | | |
|---|---|---|
| 4,687,804 | 8/1987 | Shiraishi et al. .................. 524/505 |
| 4,940,270 | 7/1990 | Yamazaki et al. .................. 293/122 |
| 5,123,688 | 6/1992 | Takado et al. .................. 293/120 |
| 5,334,647 | 8/1994 | Sperk, Jr. et al. .................. 524/507 |
| 5,484,824 | 1/1996 | Abe et al. .................. 523/436 |

*Primary Examiner*—Patrick Ryan
*Assistant Examiner*—Abraham Bahta
*Attorney, Agent, or Firm*—Cushman Darby & Cushman Intellectual Property Group of Pillsbury Madison & Sutro LLP

[57] ABSTRACT

Provided is a blow-molded article which can be readily formed with good Gloss and with substantially no surface unevenness, even without application of surface coating, and which can be used as a finished product without further treatment. The blow-molded article has a base layer and a surface layer. The base layer is formed from a thermoplastic resin material having a melt index (MI) of about 0.05–2.0 and a flexural modulus of 1,470 MPa (15,000 kgf/cm²) or more. The surface layer is formed from a colored or transparent thermoplastic resin material having an MI of about 1–30 provided that it is higher than that of the base layer, and excellent weather resistance. The thermoplastic resins used to form the base and surface layers should be resins of the same family.

27 Claims, 1 Drawing Sheet

BLOW-MOLDED ARTICLES FOR AUTOMOBILE EXTERIOR PARTS AND THE PROCESS THEREFOR

The present application relies for priority upon the inventors' Japanese Patent Application No. 06-258204 filed Oct. 24, 1994, the content of which is herein incorporated by reference.

BACKGROUND OF THE INVENTION

1. Field of the Invention

The present invention relates to blow-molded articles, especially automobile exterior parts, which comprise a base layer and a surface layer and which require no surface coating and the process for forming such parts. The invention is particularly suited for blow-molded automobile exterior parts which require a good surface gloss as well as high strength, such as spoilers, bumpers, side moldings, etc.

2. Description of Related Art

The present invention and the related art are described below with reference to a spoiler as a typical example of a blow-molded article for an automobile exterior, but the present invention should not be limited thereto.

The melt index (MI) herein referred to is the weight, in terms of Grams, of a thermoplastic resin material extruded in 10 minutes, as measured according to JIS K 6758.

Heretofore, blow-molded spoilers have been Generally formed as one layer 3–5 mm thick by using molding materials having a high MI and high rigidity, such as polyphenylene oxide (PPO), acrylonitrile-butadiene-styrene (ABS) resin, etc., to prevent the draw-down of parisons.

However, blow-molded articles formed from molding materials such as polyphenylene oxide (PPO), acrylonitrile-butadiene-styrene (ABS) resin, etc. show surface unevenness, and molded articles with a good design and a good gloss are difficult to obtain. For large-sized blow-molded articles such as spoilers, in particular, molding materials which have a low MI and high parison strength must be used in order to prevent draw-down. Marked surface unevenness consequently develops, which cannot be hidden merely by coating the molded articles with paint. This is presumably because these materials have a low MI and do not easily extend (or slip) in the molten state. Also these materials solidify rapidly when coming into contact with the cavity surface of a die and hence exhibit a poor die surface replicability. Accordingly, blow-molded articles such as spoilers, etc. generally require finishing by coating after a polishing step, and hence the manufacture through various processes.

SUMMARY OF THE INVENTION

In view of the above-described situations, an object of the present invention is to provide blow-molded automobile exterior parts which have good gloss and with substantially no surface unevenness, even without application of surface coating thereto.

According to the present invention, a blow-molded article is provided which comprises a base layer and a surface layer. The base layer is formed from a thermoplastic resin material having an MI of about 0.05–2.0 and a flexural modulus (modulus of elasticity in bending) of 1,470 MPa (15,000 kgf/cm$^2$) or more. The surface layer is formed from a colored or transparent thermoplastic resin material having an MI of about 1–30, so long as it is higher than that of the base layer, and an excellent weather resistance. The two thermoplastic resin materials are made from resins of the same family.

DETAILED DESCRIPTION OF THE INVENTION

Figure 1:
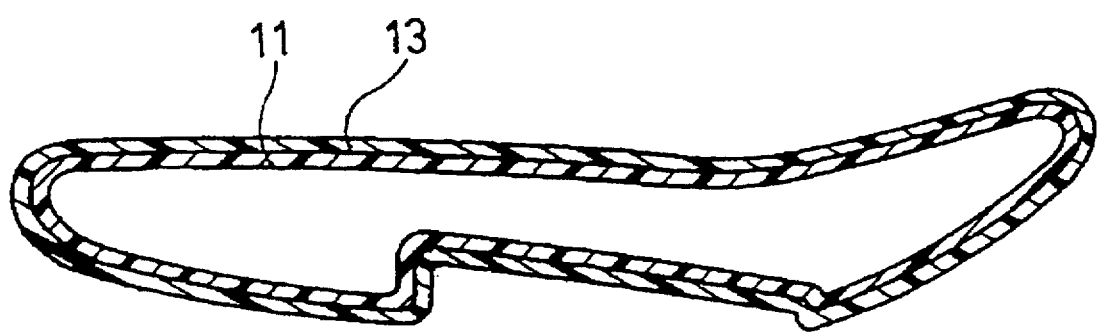
FIG. 1 shows a transverse cross section of a spoiler, which is one example of a blow-molded article according to the present invention.

The present invention is described in more detail below with reference to FIG. 1.

(1) The blow-molded article of the present invention comprises a base layer 11 and a surface layer (skin layer) 13 as shown in FIG. 1.

(2) The base layer 11 is formed out of a thermoplastic resin material having an MI of about 0.05–2.0 and a flexural modulus (modulus of elasticity in bending) of at least 1,470 MPa (15,000 kgf/cm$^2$).

The base layer 11 has the function of preventing the draw-down. When the MI is less than 0.05, molding is difficult to perform with regard to parison extrusion and blowing. When the MI is higher than 2.0, draw-down tends to occur.

The thickness of the base layer 11 is usually about 1–5 mm. When the thickness is less than about 1 mm, the strength required for automobile exterior parts can be hard to obtain. Further, the base layer cannot adequately prevent draw-down, though depending on the thickness of the surface layer. When the thickness is more than about 5 mm, the base layer is undesirably heavy.

Materials used for forming the base layer 11 are not particularly limited so long as they meet the above-mentioned mechanical characteristics. They may be at least one member selected from the group consisting of PPO, ABS resin, polypropylene (PP)-containing block copolymer, polybutylene terephthalate (PBT) and the like. They may be used alone or as a mixture of two or more thereof. When the surface layer is formed from a transparent material or a light-colored material, the base layer is desirably incorporated, according to necessity, with a coloring agent or a white coloring agent.

The material(s) used to form the base layer 11 is/are desirably incorporated with a reinforcing filler to obtain a necessary level of strength. Suitable reinforcing fillers vary depending on kind of resin used, but may be selected, for example, from talc, mica, glass (in the form of spheres or flakes), whisker, wollastonite, potassium titanate, and the like. Each filler may be used alone or in combination thereof. The amount of the reinforcing filler to be added is usually about 10–40 parts per hundred parts resin.

(3) The surface layer (skin layer) 13 is made from a colored or transparent thermoplastic resin material having an MI of about 1–30, provided that its MI is higher than that of the base layer, and excellent weather resistance qualities. When the MI is less than about 1, surface unevenness tends to develop. When the MI is higher than about 30, a stable extrusion of the surface layer 13 is difficult to maintain and the surface of the molded article tends to become wavy.

Even if the resin material itself is relatively poor in weather resistance, this can be remedied by addition of age resistance such as ultraviolet absorbers, or the like. Coloring may be effected with a pigment or dye. When the surface layer is thin and surface hiding is required, this can be accomplished by adding more pigment.

The thickness of the surface layer 13 is usually about 40 μm—3 mm. When the thickness is less than about 40 μm, the surface layer can hardly fulfil its function of hiding surface unevenness and color of the base layer. When the thickness is more than about 3 mm, the surface layer tends to undergo draw-down at the time of parison extrusion. Moreover, since the surface layer material is generally more expensive than the base layer material, it leads to increased cost. Further, more material tends to be wasted during a color change.

The resin material for forming the surface layer 13 may suitably include PP-containing resins which are transparent and readily develop a good gloss, for example, highly crystalline PP-containing block copolymers, highly crystalline PP homopolymers, and PP-containing random copolymers. In particules, the PP-containing resins show a relatively low solidification speed after contacting the die and exhibit good die surface replicability. Further, polycarbonate (PC), PBT, poly(methyl methacrylate) (PMMA), acrylonitrile-ethylene propylene diene monomer-styrene polymer (AES) resin, and the like may be also used.

(4) The thermoplastic resin materials used to form the base and surface layers should be resins of the same family. The term "resins of the same family" used herein refers to a resin and/or a resin mixture(s) containing at least one common resin component, or a resin(s) containing at least one common monomer unit component. This is important for keeping the base layer and the surface layer closely adhered to each other to prevent the draw-down of the surface layer at the time of parison extrusion. It is also important for ensuring the integration of the base layer 11 and the surface layer 13 after molding to secure a high rigidity.

To securely maintain close adhesion of the base layer 11 to the surface layer 13, a blend with the surface layer material may be also used as the base layer material.

Table 1 shows examples of combinations of these resins according to the present invention.

TABLE 1

Examples of resin combinations

| Base layer material | Surface layer material |
| --- | --- |
| PP-containing block copolymer and *1) | PP-containing highly crystalline block copolymer |
| PP-containing block copolymer and *1) | PP-containing random copolymer |
| PP-containing block copolymer and *2) | Highly crystalline PP homopolymer |
| PBT containing reinforcing filler | PC/PBT |
| ABS resin | AES resin |
| PC/PBT containing reinforcing filler | PC |
| ABS resin/PMMA | PMMA |

Note:
*1) Containing 15 parts of talc per hundred parts of resin
*2) Containing 30 parts of talc per hundred parts of resin (5) Hereunder, one example of the process for producing the molded automobile exterior parts described above is illustrated below.

First, the base layer (resin) material and the surface layer (resin) material are prepared and extruded with a multi-layer blow molding machine into a double-layer parison with the base layer inside and the surface layer outside. The conditions for this extrusion process are, for example, as follows:

Resin temperature: 175°–200° C.,
Die temperature: 180°–210° C.,
Extrusion speed: 3–60 m/min The surface layer material has a relatively high MI but the base layer material has a relatively low MI, so the surface layer material is closely adhered to the base layer material and, hence, no draw-down develops. Further, since the surface layer material has a relatively high MI, die lines are substantially suppressed and a highly glossy surface can be easily obtained.

Then, blow molding is carried out by blowing air into the parison. The conditions of the blow molding are, for example, as follows:

Degree of mirror polishing of die cavity: #1000 or more,
Air vent hole: 30–70 mm in pitch, 0.3–1.0 mm in diameter,
Die temperature: 30°–80° C.,
Resin temperature during blowing: 180°–230° C.,
Blow air pressure: 2.5 kgf/cm$^2$ (245 kPa)—9.0 kgf/cm$^2$ (882 kPa)

Since the surface layer material has a high MI, the material flows well and exhibits a good die surface replicability. Particularly when a PP-containing resin is used, the material slowly solidifies after contacting the die cavity surface and exhibits superior die surface replicability, so that glossy products can be readily obtained.

The blow-molded automobile exterior parts thus produced have substantially no unevenness on their exteriors and can be used as finished products without further treatment. However, they may be also further flame-treated, for example, to improve the gloss, or treated with a clear coat to increase scratch resistance and to improve appearance.

The blow-molded automobile exterior parts according to the present invention have a base layer and a surface layer, the base layer being formed out of a thermoplastic resin material having an MI of about 0.05–2.0 and a flexural modulus (modulus of elasticity in bending) of 1470 MPa (15,000 kgf/cm$^2$) or more. The surface layer is formed from a colored or transparent thermoplastic resin material having an MI of about 1–30 and higher than that of the base layer, and excellent weather resistance. The thermoplastic resins used to form the base and surface layers being resins of the same family, whereby the following actions and effects are obtained.

In extruding of double-layer parisons, since the surface layer material has a relatively high MI but the base layer material has a relatively low MI, the surface layer material closely adheres to the base layer material and hence substantially no draw-down develops. Further, since the surface layer material has a relatively high MI, virtually no die lines develops.

While blowing air into the parison, since the surface layer material has a relatively high MI, the material flows well and exhibits good die surface replicability.

Accordingly, the blow-molded automobile exterior parts according to the present invention can be readily obtained with substantially no surface unevenness and with good gloss, even without applying a surface coating, and they can be used as finished products without further treatment.

To confirm the effect of the present invention, two spoilers having a structure as shown in FIG. 1 were produced by blow-molding with the following materials and under the following conditions: In the both runs, an exemplary red spoiler with substantially no unevenness on the surface and an excellent gloss was obtained. The surface layer material ~~ is slightly better in gloss but is slightly lower in scratch resistance than the surface layer material 1.

(1) Base layer material
PP-containing block copolymer (comonomer: ethylene 10%) containing 15 parts of talc per hundred parts of resin, MI: 0.3, flexural modulus (modulus of elasticity in bending: 27,000 kgf/cm² (2,646 MPa)

(2) Surface layer material (two types)

① Highly crystalline PP homopolymer, MI: 1.8, degree of crystallinity: 75%, Rockwell hardness: R 85 (JIS K 7110), glossiness: 87 (angle of incidence 60°, JIS Z 8741), haze: 7% (thickness 1 mm, ASTM D 1003)

② PP-containing random copolymer (comonomer: ethylene 10%), MI: 3.7, Rockwell hardness: R 68 (23° C.), glossiness: 92 (angle of incidence 60°, JIS Z 8741), haze: 12.1% (thickness 1 mm, ASTM D 1003)

(2) Molding conditions

Degree of mirror polishing of die cavity surface: #1500, air vent hole: 50 mm in pitch, 0.5 mm in diameter, die temperature: 40° C., resin temperature in blowing: 200° C., blow air pressure: 5 kgf/cm² (490 kPa)

What is claimed is:

1. A blow-molded article made from a multi-layer parison that includes a discrete base layer and a discrete surface layer,
    said base layer being formed from a first thermoplastic resin material having a melt index of about 0.05–2.0 and a modulus of elasticity in bending of at least about 1,470 MPa (15,000 kgf/cm²),
    said surface layer being formed from a second thermoplastic resin material having a melt index of about 1–30, wherein the melt index of said surface layer is higher than the melt index of said base layer, wherein said first and second thermoplastic resin materials contain at least one common resin component or common monomer unit component and are adhered together.

2. A blow-molded article according to claim 1, wherein said first thermoplastic resin material comprises at least one member selected from the group consisting of PPO, ABS resin, a PP-containing block copolymer and PBT, and wherein said second thermoplastic resin material comprises at least one material selected from the group consisting of a crystalline PP-containing block copolymer, a crystalline PP homopolymer, a PP-containing random copolymer, PC, PBT, PMMA and AES resin.

3. A blow-molded article according to claim 2, wherein said first thermoplastic resin material is a PP-containing block copolymer and said second thermoplastic resin material is a crystalline PP-containing block copolymer or a PP-containing random copolymer.

4. A blow-molded article according to claim 2, wherein said first thermoplastic resin material is a PP-containing block copolymer mixed with a reinforcing filler material.

5. A blow-molded article according to claim 1, wherein the blow-molded article is an automobile spoiler.

6. A blow-molded article according to claim 1, wherein said second thermoplastic resin material is colored.

7. A blow-molded article according to claim 1, wherein said second thermoplastic resin material is substantially transparent.

8. A blow-molded article according to claim 1, wherein said base layer is between about 1 mm and about 5 mm thick.

9. A blow-molded article according to claim 1, wherein said surface layer is between about 40 μm and about 3 mm thick.

10. A blow-molded article according to claim 1, wherein said first thermoplastic resin material is mixed with a reinforcing filler material.

11. A blow-molded article according to claim 10, wherein said first thermoplastic resin material and said reinforcing filler material are mixed in a ratio of between 10–40 parts of said reinforcing filler material to 100 parts of said first thermoplatic resin material.

12. A blow-molded article according to claim 10, wherein said reinforcing filler material comprises at least one of talc, mica, glass, whisker, wollastonite, and potassium titanate.

13. A blow-molded article according to claim 4, wherein said first thermoplastic resin material and said reinforcing filler material are mixed in a ratio of between 10–40 parts of said reinforcing filler material to 100 parts of said first thermoplastic resin material.

14. A process for producing molded articles, which comprises the steps of:
    forming a base layer material from a first thermoplastic resin material having a melt index of about 0.05–2.0 and a flexular modulus of at least 1,470 MPa (15,000 kgf/cm²);
    forming a surface layer material from a second thermoplastic resin material having a melt index of about 1°–30°;
    extruding a multi-layer parison having a base layer and a surface layer;
    wherein the melt index of the surface layer is higher than the melt index of the base layer, and first and second thermoplastic resin materials contain at least one common resin component or common monomer unit component and placing the multi-layer parison in a mold cavity; and
    blowing the multi-layer parison to form the molded article.

15. A process for producing blow-molded articles according to claim 14, wherein the step of forming the base layer material includes selecting as the first thermoplastic resin material at least one member selected from the group consisting of PPO, ABS resin, a PP-containing block copolymer and PBT, and the step of forming the surface layer material includes selecting as the second thermoplastic resin material at least one material selected from the group consisting of a crystalline PP-containing block copolymer, a crystalline PP homopolymer, a PP-containing random copolymer, PC, PBT, PMMA and AES resin.

16. A process for producing blow-molded articles according to claim 15, wherein the first thermoplastic resin material is a PP-containing block copolymer and the second thermoplastic resin material is a crystalline PP-containing block copolymer or a PP-containing random copolymer.

17. A process for producing blow-molded articles according to claim 15, wherein the first thermoplastic resin material is a PP-containing block copolymer mixed with a reinforcing filler material.

18. A process for producing blow-molded articles according to claim 14, wherein the blow-molded article is an automobile spoiler.

19. A process for producing blow-molded articles according to claim 14, wherein the second thermoplastic resin material is colored.

20. A process for producing blow-molded articles according to claim 14, wherein the second thermoplastic resin material is substantially transparent.

21. A process for producing blow-molded articles according to claim 14, wherein the base layer is formed to be about 1 mm and about 5 mm thick.

22. A process for producing blow-molded articles according to claim 14, wherein the surface layer is formed to be about 40 μm and about 3 mm thick.

23. A process for producing blow-molded articles according to claim 14, including the step of mixing the first thermoplastic resin material with a reinforcing filler material.

24. A process for producing blow-molded articles according to claim 23, including the step of mixing the first thermoplastic resin material and the reinforcing filler material in a ratio of between 10–40 parts of the reinforcing filler material to 100 parts of the first thermoplastic resin material.

25. A process for producing blow-molded articles according to claim 23, wherein the reinforcing filler material comprises at least one of talc, mica, glass, whisker, wollastonite, and potassium titanate.

26. A process for producing blow-molded articles according to claim 17, including the step of mixing the first thermoplastic resin material and the reinforcing filler material in a ratio of between 10–40 parts of the reinforcing filler material to 100 parts of the first thermoplastic resin material.

27. A blow-molded article produced by the process of claim 14.

* * * * *